United States Patent

Hirashita

[11] Patent Number: 5,450,781
[45] Date of Patent: Sep. 19, 1995

[54] BOOSTER

[75] Inventor: Hiroshi Hirashita, Saitama, Japan

[73] Assignee: Jidosha Kiki Co., Ltd., Tokyo, Japan

[21] Appl. No.: 200,227

[22] Filed: Feb. 23, 1994

[30] Foreign Application Priority Data

Mar. 12, 1993 [JP] Japan .................. 5-079123

[51] Int. Cl.⁶ ............................. F15B 11/00
[52] U.S. Cl. ......................... 91/533; 92/48;
92/169.2; 91/376 R
[58] Field of Search ............ 92/48, 169.1, 169.2;
91/369.1, 369.2, 369.3, 369.4, 376 R, 533

[56] References Cited

U.S. PATENT DOCUMENTS

| | | | |
|---|---|---|---|
| 4,400,942 | 8/1983 | Reinartz et al. | 91/369.2 |
| 4,409,885 | 10/1983 | Reinartz et al. | 91/369.2 |
| 4,611,526 | 9/1986 | Arino et al. | |
| 4,664,016 | 5/1987 | Tobisawa | |
| 4,718,326 | 1/1988 | Sugiura et al. | 92/48 |
| 4,747,336 | 5/1988 | Uyama | 91/376 R |
| 4,759,255 | 7/1988 | Shimamura | 91/6 |
| 4,787,292 | 11/1988 | Tsuyuki et al. | 91/369.3 |
| 4,862,787 | 9/1989 | Suzuki et al. | 91/369.2 |
| 4,881,452 | 11/1989 | Newhouse | 92/48 |
| 4,995,302 | 2/1991 | Suzuki et al. | 91/376 R |
| 5,083,495 | 1/1992 | Satoh | 91/369.2 |
| 5,121,673 | 6/1992 | Araki | 91/369.1 |
| 5,228,377 | 7/1993 | Watanabe | 91/376 R |
| 5,287,793 | 2/1994 | Satoh et al. | 91/376 R |

FOREIGN PATENT DOCUMENTS 0480782  4/1992  European Pat. Off. ......... 92/48

Primary Examiner—Thomas E. Denion
Attorney, Agent, or Firm—Flynn, Thiel, Boutell & Tanis

[57] ABSTRACT

An improvement of the inner periphery of a power piston which is connected to a valve body of a booster is disclosed. The inner periphery of the power piston comprises a radial portion which is disposed in abutment against an end face of a step formed on the valve body, an annular groove located radially outward of the radial portion, and a step formed at the boundary between the radial portion and the annular groove. The provision of the annular groove and the step assures sufficient strength around the inner periphery of the power piston without requiring an increased wall thickness of the power piston.

4 Claims, 3 Drawing Sheets 5,450,781

BOOSTER

FIELD OF THE INVENTION

The invention relates to a booster, and more particularly, to the improvement of an inner periphery of a power piston connected to a valve body thereof.

DESCRIPTION OF THE PRIOR ART

A booster is well known in the art which includes a valve body slidably disposed within a shell, and a power piston including an inner periphery which is connected to the valve body.

It is known in the art to provide a power piston with a forwardly extending tubular portion around its inner peripheral edge, with the forward end of the tubular portion being disposed in abutment against an end face defined by a step on the valve body for connection therewith. Another construction for the power piston comprises a radial portion formed around the inner peripheral edge and disposed in abutment against the end face formed by a step on the valve body from the rear side for purpose of connection therewith.

A power piston with a tubular portion extending around the inner peripheral edge of the prior art assures a required strength by the presence of the tubular portion, but suffers from an increased axial length of the valve body as a result of the provision of the tubular portion.

On the other hand, with the conventional power piston with a radial portion, the inner peripheral edge of which is disposed in abutment against the end face defined by a step on the valve body, it is necessary to increase the wall thickness of the power piston in order to secure a sufficient strength for the inner periphery including the radial portion. However, the increased thickness of the power piston increases its weight as well as related manufacturing cost.

SUMMARY OF THE INVENTION

In view of the foregoing, in a booster including a valve body slidably disposed within a shell and a power piston having an inner periphery which is connected to the valve body, in accordance with the invention, the inner periphery of the power piston comprises a radial portion which extends radially and which is disposed in abutment against an end face defined by a step on the valve body from the rear side, an annular groove formed on the outer section of the radial portion and extending axially forward, and a step formed at a boundary between the annular groove and the radial portion.

With this arrangement, a sufficient strength for the inner periphery of the power piston is secured by the provision of the annular groove and the step around the inner periphery of the power piston, while the inner peripheral edge of the radial portion of the power piston is disposed in abutment against the end face defined by the step on the valve body, whereby eliminating the need for an increased axial length of the valve body as compared with the prior art wherein a tubular portion is formed around the inner peripheral edge and disposed in abutment against the end face defined by the step on the valve body. In this manner, a sufficient strength can be secured around the inner periphery of the power piston without increasing the wall thickness of the power piston.

Above and other objects, features and advantages of the invention will become apparent from the following description of several embodiments thereof with reference to the drawings.

DETAILED DESCRIPTION OF EMBODIMENTS

Figure 1:
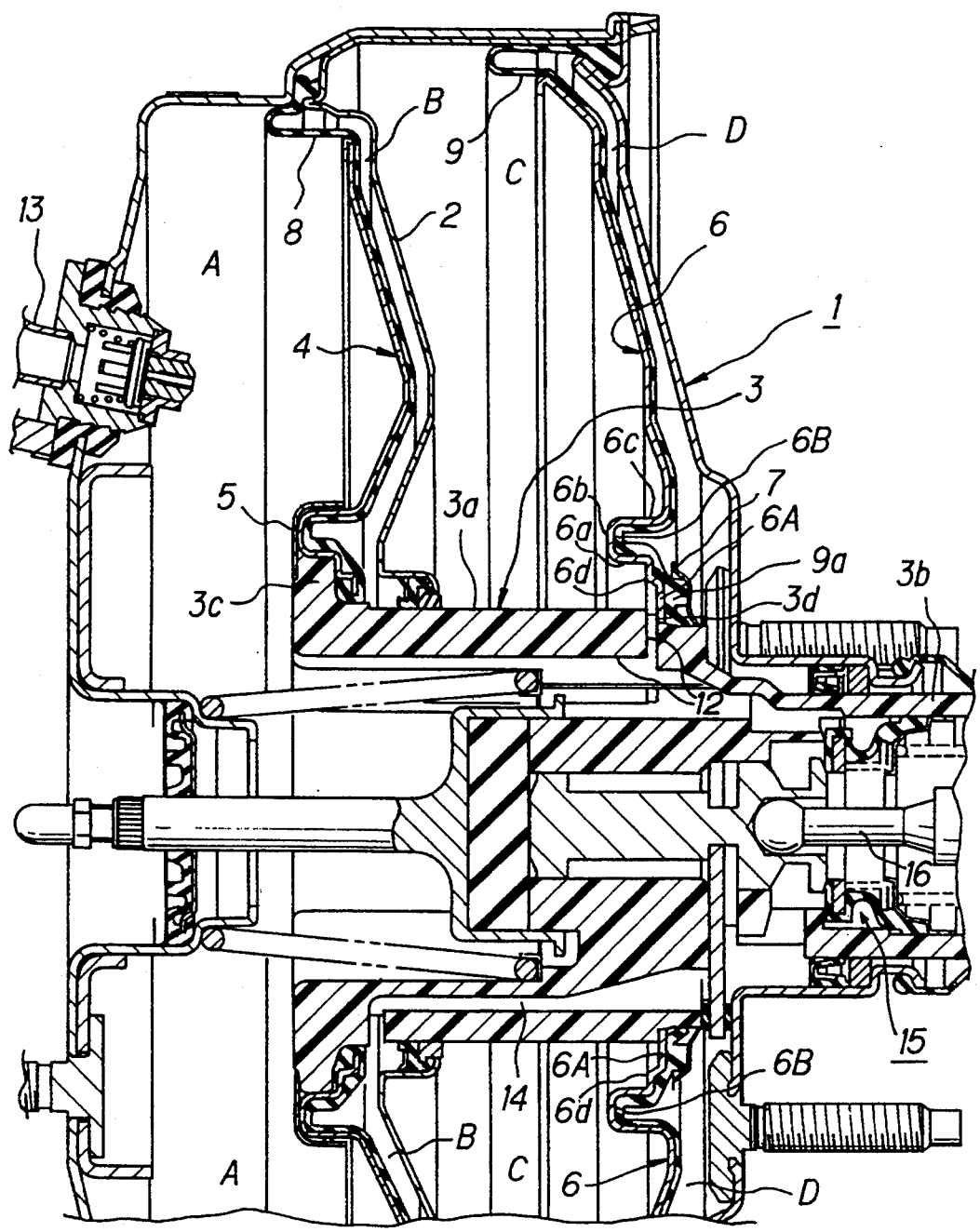
FIG. 1 is a cross section of one embodiment of the invention.

Referring to the drawings, several embodiments of the invention will now be described. FIG. 1 shows the internal construction of a brake booster of tandem type, including a shell 1, the interior of which is divided by a center plate 2 into a forward and a rear space, with a substantially cylindrical valve body 3 slidably extending through the axial portion of the center plate 2.

The valve body 3 includes a portion 3a of a larger diameter and a portion 3b of a smaller diameter, and is provided with a flange 3c around its outer periphery at its foremost end. The inner periphery of a power piston 4 is fitted around the flange 3c, and is held in place or against withdrawal by a retainer 5. At its rear end, the outer periphery of the larger portion 3a is reduced in diameter than the diameter of the remainder thereof to define a step having an end face 3d, against which the inner peripheral edge of a rear power piston 6 is disposed in abutment from the rear side and is held in place or against withdrawal by a retainer 7.

Front and rear diaphragms 8, 9 are applied to the back surfaces of the power pistons 4, 6, respectively, to define a constant pressure chamber A and a variable pressure chamber B across the front diaphragm 8 and a constant pressure chamber C and a variable pressure chamber D across the rear diaphragm 9.

The constant pressure chambers A and C communicate with each other through a constant pressure passage 12 formed in the valve body 3, and also communicate with a source of negative pressure through a tubing 13 connected to the front wall of the shell 1 which introduces a negative pressure. In this manner, the negative pressure is normally introduced into the both constant pressure chambers A and C. The both variable pressure chambers B and D communicate with each other through a variable pressure passage 14 formed in the valve body 3.

A valve mechanism, which is well known in itself, is disposed within the valve body and is operated in response to the operation of an input shaft 16 for switching the communication or the interruption of communication between the both constant pressure chambers A, C and the both variable pressure chambers B, D.

The inner periphery of the rear power piston 6 comprises a flat radial portion 6A which extends radially, and an annular groove 6B which is formed adjacent to, but radially outward of the radial portion 6A and bulging in the forward direction. The annular groove 6B comprises an axially extenting inner tubular portion 6a, a radial portion 6b which continues from the tubular portion 6a, and an axially extending outer tubular portion 6c which extends from the radial portion 6b. Beyond the outer tubular portion 6c, the radially outer portion of the rear piston extends generally radially outward in the same manner as in the prior art.

In the present embodiment, a step 6d which is circumferentially continuous is formed at the boundary between the inner tubular portion 6a of the annular groove 6B and the radial portion 6A.

In the present embodiment, the axial size of the inner tubular portion 6a and the radial size of the radial portion 6b which constitute the annular groove 6B are chosen to be substantially equal to the radial size of the radial portion 6A which defines the inner peripheral edge. The axial size of the outer tubular portion 6c which forms the annular groove 6B is chosen to be slightly longer than the radial size of the radial portion 6A.

When the rear power piston 6 constructed in the manner mentioned above is connected to the outer periphery of the valve body 3, the radial portion 6B which defines the inner peripheral edge is fitted around the rear end of the radial portion 3a which has a reduced diameter, from the rear side, and the radial portion 6A is disposed in abutment against the end face 3d of the step on the valve body 3. Under this condition, a bead 9a extending around the inner periphery of the rear diaphragm 9 is brought into abutment against the radial portion 6A from the rear side, and finally the retainer 7 is fitted around the outer periphery of the valve body 3 from the rear side. In this manner, the radial portion 6A of the rear power piston 6 and the bead 9a extending around the inner periphery of the rear diaphragm 9 are axially held between the end face 3d of the step and the retainer 7 to be connected around the outer periphery of the valve body 3.

In this manner, with the rear power piston 6 of this embodiment, a sufficient strength around the inner periphery of the rear power piston can be assured without increasing the wall thickness of the rear power piston 6 through the provision of the annular groove 6B and the step 6d.

Figure 2:
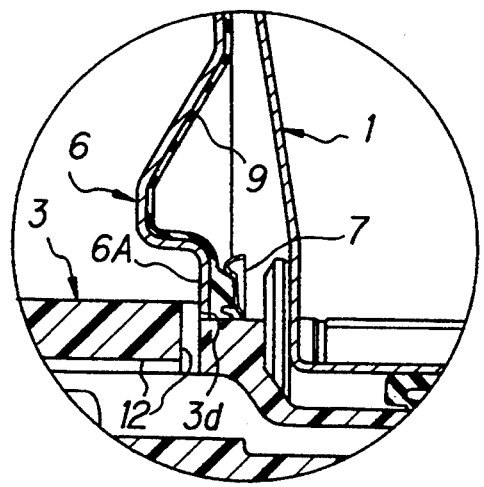
FIG. 2 is a similar cross section of part according to the prior art which corresponds to a part shown in FIG. 1.

By contrast, in the prior art construction shown in FIG. 2, the inner peripheral edge is formed with a radial portion 6A while a portion located radially outward thereof is formed to bulge significantly in the forward direction. The radial portion 6A is disposed in abutment against the end face 3d of the step on the valve body 3 for purpose of connection therewith. With the construction shown in FIG. 2, internal stresses produced in the radial portion 6A upon actuation of the brake booster will be increased, and accordingly, the wall thickness of the rear power piston 6 had to be increased in order to secure a sufficient strength around the inner periphery including the radial portion 6A. This resulted in an increase in the weight and the manufacturing cost of the rear power piston 6.

In comparison to the prior art construction shown in FIG. 2, in the present embodiment, the provision of the annular groove 6B and the step 6d allows a sufficient strength to be secured around the inner periphery of the rear power piston 6 without requiring an increased wall thickness of the rear power piston 6.

Figure 3:
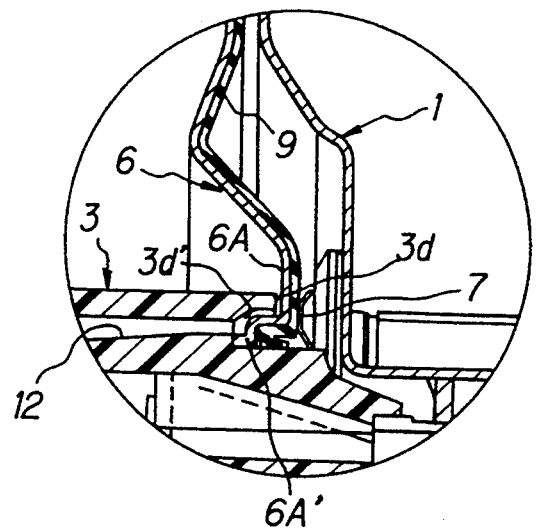
FIG. 3 is a similar cross section illustrating a different prior art.

FIG. 3 shows another example of the prior art in which a stepped tubular portion 6A' is formed around the inner peripheral edge of the rear power piston 6, and the front end of the tubular portion 6A' is disposed in abutment against the bottom of an annular groove 3d' formed by a step on the valve body 3. In this example, as a result of such construction, the annular groove 3d' defines the rear end of the constant pressure passage 12, and accordingly it was necessary to maintain a clearance between the end face 3d of the step into which the annular groove 3d' opens and a radial portion 6a which is located radially outward of the tubular portion 6A'. This resulted in an increased axial length of the valve body 3.

By contrast, in the present embodiment, the inner peripheral edge of the radial portion 6A of the rear power piston 6 is disposed in abutment against the end face 3d defined by the step on the valve body 3, whereby a sufficient strength of the rear power piston can be secured without increasing the axial size of the valve body 3.

Figure 4:
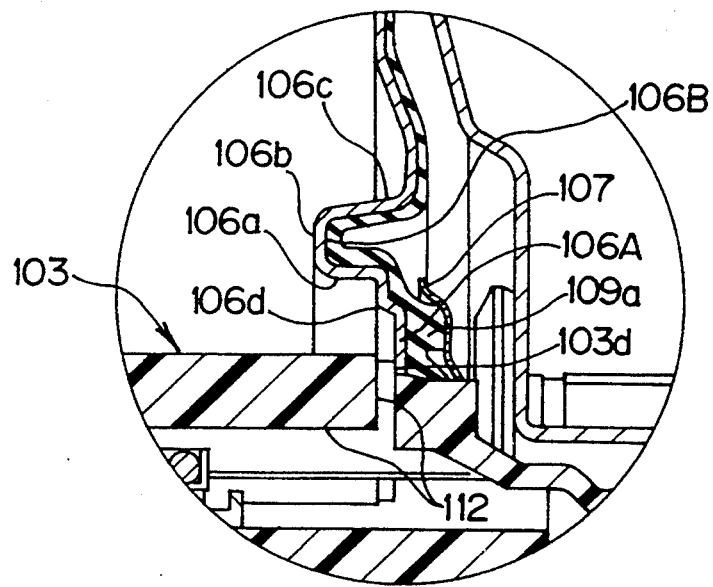
FIG. 4 is a cross section of another embodiment of the invention.

In the described embodiment, the inner and outer tubular portions 6a, 6c which form the annular groove 6B are shown as exhibiting a uniform inner diameter over the entire-axial region, but an outer tubular portion 106c may be tapered to exhibit a diameter which increases in the rearward direction, as shown in FIG. 4.

While the invention has been disclosed above in connection with several embodiments thereof, it should be understood that a number of changes, modifictions and substitutions therein will readily occur to one skilled in the art from the above disclosure without departing from the spirit and scope of the invention defined by the appended claims.

What is claimed is:

1. A booster including tandem power pistons slidably disposed within a shell, and a valve body connected to an inner periphery of a rear piston of said power pistons; characterized in that the inner periphery of said rear power piston comprises a radial portion which extends radially and is disposed to abut against an end face defined by a step on the valve body from the rear side, an annular groove located radially outward of the radial portion and extending axially forward, and a step formed radially inwards of the annular groove and setting said radial portion rearwards of the inner periphery of the annular groove, said booster further including a rear diaphragm disposed on a rear side of said rear piston and along an inner surface of said annular groove, said valve body having an outer peripheral valve body surface and said rear diaphragm having an inner peripheral bead portion which is disposed about said outer peripheral valve body surface rearwardly of said radial portion and defines a fluid-tight seal therebetween, said valve body having a retainer member mounted thereto with said radial portion and said bead portion being retained between said step on said valve body and said retainer member.

2. A booster according to claim 1 in which the annular groove comprises an axially extending inner tubular portion, a radial portion which extends radially from the tubular portion, and an axially extending outer tubular portion which extends-from the radial portion, the step being formed at the rear end of the inner tubular portion of the annular groove.

3. A booster according to claim 2 in which the radial size of the radial portion which forms the annular groove and the axial size of the inner tubular portion which forms the annular groove are chosen to be substantially equal to the radial size of the radial portion which is disposed in abutment against the end face defined by the step on the valve body, the axial size of the outer,tubular portion which forms the annular groove being chosen to be slightly greater than the axial size of the inner tubular portion which forms the annular groove.

4. A booster according to claim 3 in which the outer tubular portion which forms the annular groove is tapered to increase its diameter in the rearward direction.

* * * * *

UNITED STATES PATENT AND TRADEMARK OFFICE
CERTIFICATE OF CORRECTION

PATENT NO. : 5 450 781
DATED : September 19, 1995
INVENTOR(S) : Hiroshi HIRASHITA It is certified that error appears in the above-indentified patent and that said Letters Patent is hereby corrected as shown below:

Column 4, line 52; replace "extends-from" with
---extends from---.

line 61; replace "outer,tubular" with
---outer tubular---.

Signed and Sealed this

Thirteenth Day of February, 1996

Attest:

BRUCE LEHMAN

*Attesting Officer*  *Commissioner of Patents and Trademarks*